Sept. 10, 1957 W. F. MILLER 2,805,600
REAR VIEW MIRROR
Filed July 27, 1953 2 Sheets-Sheet 1
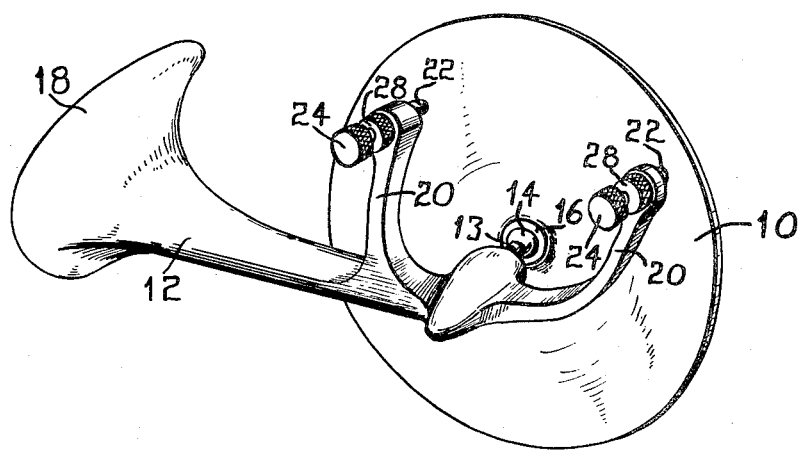
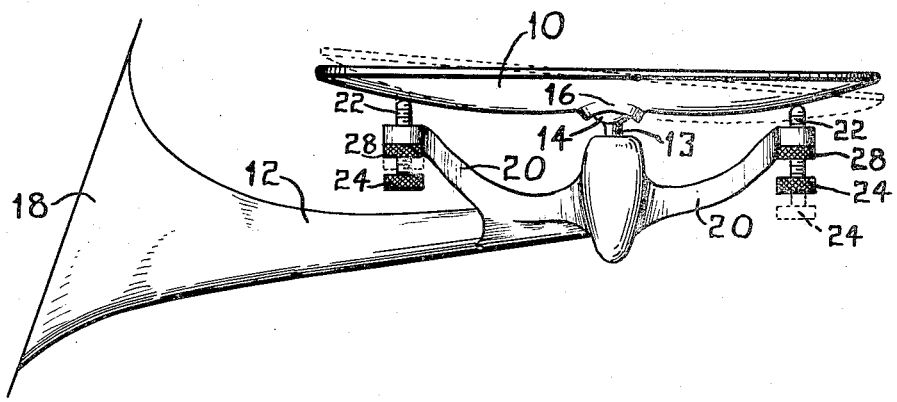
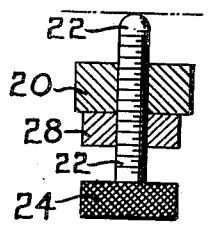
INVENTOR.
WALTER F. MILLER
BY
ATTORNEY Sept. 10, 1957 W. F. MILLER 2,805,600
REAR VIEW MIRROR
Filed July 27, 1953 2 Sheets-Sheet 2
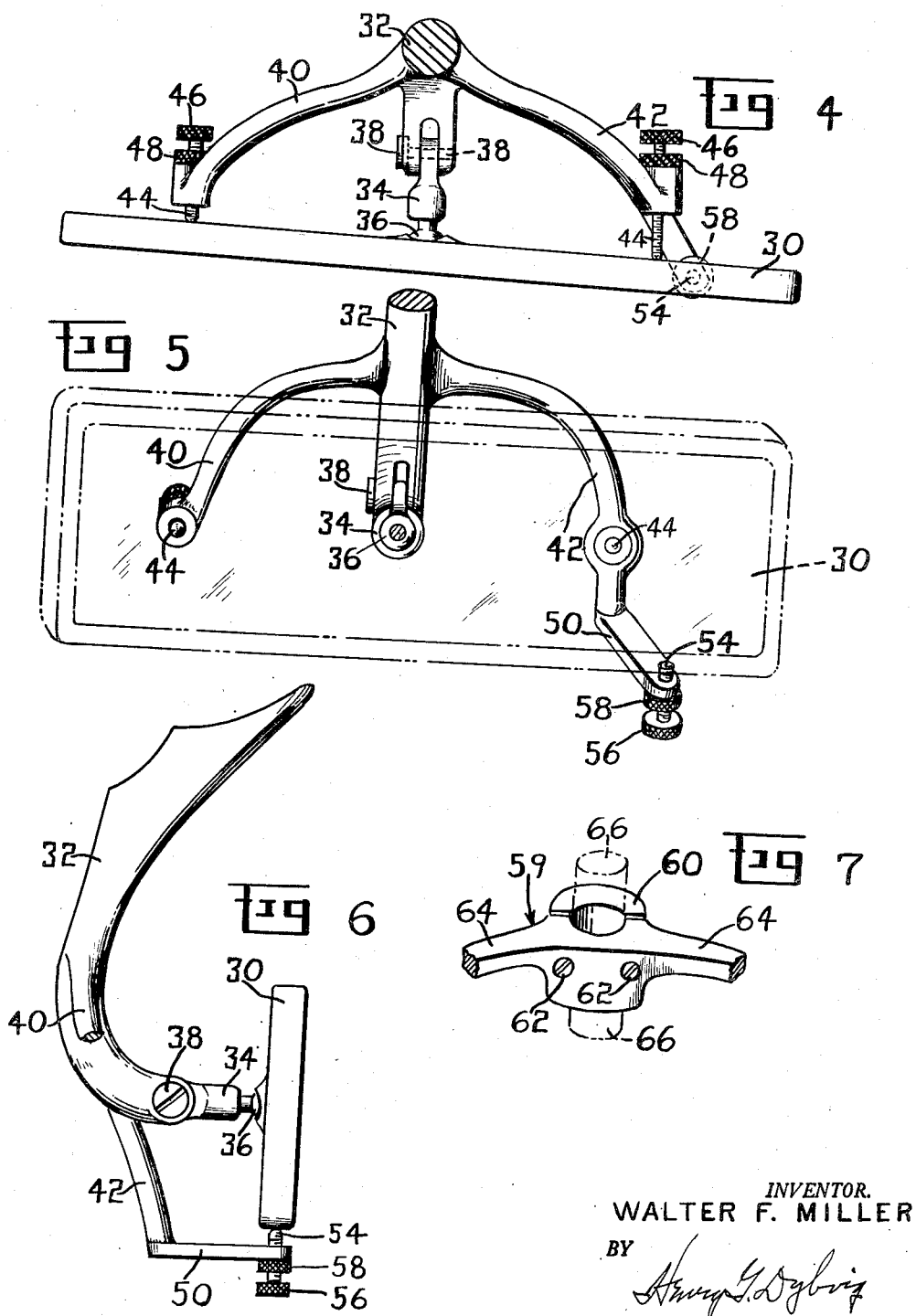
INVENTOR.
WALTER F. MILLER
BY
Henry G. Dybvig
ATTORNEY

United States Patent Office 2,805,600
Patented Sept. 10, 1957

2,805,600

REAR VIEW MIRROR

Walter F. Miller, Dayton, Ohio

Application July 27, 1953, Serial No. 370,249

1 Claim. (Cl. 88—98)

This invention relates to a rear view mirror. It relates particularly to a rear view mirror for automobiles, which mirror is provided with means for establishing an adjustment position. However, the invention is not so limited, in that it may be used with other types of mirrors and employed in other applications.

Nearly all automobile owners have experienced difficulty in maintaining proper adjustment of the rear view mirrors of their automobiles. Upon every occasion when an automobile is washed, the rear view mirrors are moved out of adjustment. The driver of the automobile frequently has difficulty in readjusting the mirrors to their optimum positions. Oftentimes the driver believes, after numerous attempts at readjustment, that the previous position of the mirror is impossible to re-obtain.

Hence, it is an object of this invention to provide means by which a rear view mirror may be easily readjusted to its proper position if the mirror has been moved from the desired position.

Another object of the invention is to provide such a device which is simple in construction and durable.

Other objects and advantages reside in the construction of parts, the combination thereof and the mode of operation, as will become more apparent from the following description.

Referring to the drawings,

Figure 1 is a perspective view of the rear portion of a circular rear view mirror provided with the adjustment means of this invention.

Figure 2 is a top plan view of the device shown in Figure 1. Figure 2 discloses the manner in which a rear view mirror may be adjusted by means of the invention.

Figure 3 is a sectional view showing an adjustment screw and locking nut mounted at the end of a bracket arm.

Figure 4 is a top plan view of a rectangular rear view mirror provided with the adjustment means of this invention.

Figure 5 is a front view of the adjustment means of this invention as it is applied to a rectangular mirror.

Figure 6 is a side elevational view, with one bracket arm broken away, of the device shown in Figures 4 and 5.

Figure 7 is a fragmentary, perspective view of a pair of adjustment arms with clamping means used in providing a conventional mirror bracket with a device of this invention.

A circular rear view mirror 10 is of the type usually attached to the side of an automobile and is shown in Figures 1 and 2. The mirror 10 is pivotally supported at the center thereof upon an extension bracket 12 by means of a stem 13 having a spherical end 14 cooperating with a recessed portion or socket 16 at the back of the mirror 10, forming a universal joint. A flange 18 of the extension bracket 12 is adapted to be attached to the side portion of an automobile. At either side of the stem 13 is an arm 20, which extends from the stem 13 toward the periphery of the mirror 10. Adjacent the end of each arm 20 is a threaded aperture. Adjustably attached within each threaded aperture is a set screw 22 having a knurled head 24. Each screw 22 is disposed substantially parallel to the stem 13. Threadedly attached to each screw 22 and positioned between the head 24 and the arm 20 is a lock nut 28.

When it is desired to establish the proper position of the mirror 10, the mirror is pivoted about the spherical end 14 until it is adjusted as desired. Then each of the screws 22 is threadedly rotated until the end opposite the head 24 abuts the back of the mirror 10. A fine angular adjustment of the mirror 10 may be accurately and closely accomplished by threadedly adjusting the screws 22 which are abutting the back of the mirror 10, thereby adjusting the mirror a very small amount to an exact desired position, as shown in Figure 2.

When the proper position is determined, the ends of the screws 22 are firmly abutting the back of the mirror 10. The lock nuts 28 are then tightened against the arm 20, which locks the screws 22 in proper threaded position upon the arms 20. The proper adjusted plane of the mirror 10 has thereby been established. The spherical end 14 and the ends of the two screws 22 are three points, establishing the plane.

The mirror 10 may be pivotally moved about the spherical end 14, but the mirror can easily be returned to proper adjustment by setting the mirror so that the back of the mirror contacts the ends of the set screws 22. If the mirror is intentionally or unintentionally moved or vibrates from proper angular position, it is easily and quickly repositioned.

Figures 4, 5, 6 and 7 disclose the invention as it is employed to establish the proper adjustment of a rectangular mirror 30, which is supported at the lower portion of a vertical bracket 32. This type of mirror is usually mounted within an automobile adjacent the windshield thereof. The mirror is attached at the end of a substantially horizontal stem 34 provided with a sphere 36 at the end thereof. The stem 34 is pivotally attached to the bracket 32 by means of a pin 38.

Extending from the bracket 32 is an arm 40 and an arm 42. The arm 40 extends to the back of the mirror 30, and the arm 42 extends to a position under the mirror 30. At the end of the arm 40 and intermediate the ends of the arm 42 is threadedly attached a horizontally disposed set screw 44 having a head 46 and a lock nut 48. The arm 42 has a horizontal portion 50, at the end of which is threadedly attached a vertically disposed set screw 54 having a head 56 and provided with a lock nut 58. The rectangular mirror 30 is adjusted to proper position similarly to the manner in which the circular mirror 10 is adjusted. In other words, proper adjustment is set in such a manner that the screws 44 and 54 abut the mirror. After the mirror 30 is properly adjusted and the mirror 30 is correctly set, the correct position of the mirror can easily be obtained by pivotally adjusting the mirror 30 until the bottom of the mirror engages the end of the screw 54 and the back of the mirror abuts the ends of the screws 44.

Hence, it may be understood that by means of this invention, an automobile side mirror, such as mirror 10, or an automobile inside mirror, such as mirror 30, can easily and accurately be adjusted.

Figure 7 discloses an adjustment arm clamping device 59 comprising a clamp 60, including screws 62, provided with arms 64, at the ends of which may be threadedly attached suitable set screws. The clamp 60 may be a casting or made in any other suitable manner and is adapted to clamp upon any conventional mirror bracket 66, thus providing means by which the device of this invention is applied to any conventional mirror.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A rear view mirror assembly for use on a motor vehicle, a bracket for attachment to the motor vehicle, said bracket having a stem provided with a spherical end, a mirror having a back portion provided with a socket within which the spherical end of the stem is movably retained, the mirror being adapted to be disposed substantially vertical, the combination comprising a pair of laterally disposed spaced-apart arms attached to the bracket, one of the arms having a portion extending to a position adjacent the back portion of the mirror at one side of the stem, the other arm having a portion extending to a position adjacent the back of the mirror at the other side of the stem, a plurality of adjustment screw members, there being an adjustment screw member horizontally disposed and adjustably attached to each of said portions of the arms, each of said screw members being in engagement with the back portion of the mirror, one of the arms having a vertical portion extending downwardly therefrom and a horizontal portion extending from said vertical portion to a position below the mirror, there being an adjustment screw member vertically disposed and adjustably attached to said horizontal portion of the arm and in engagement with the bottom portion of the mirror, the last said adjustment screw member thus being disposed substantially normal to the other adjustment screw members, the adjustment screw members thus serving as adjustment means for positioning of the mirror with respect to the bracket, the adjustment screw members determining said position of the mirror.

References Cited in the file of this patent

UNITED STATES PATENTS

| | | |
|---|---|---|
| 700,717 | Bostrom | May 20, 1902 |
| 1,992,828 | La Hodny et al. | Feb. 26, 1935 |
| 2,102,012 | La Hodny | Dec. 14, 1937 |
| 2,338,780 | Poncher et al. | Jan. 11, 1944 |
| 2,534,495 | Younghusband | Dec. 19, 1950 |
| 2,579,225 | Borst et al. | Dec. 18, 1951 |
| 2,638,035 | Macgeorge et al. | May 12, 1953 |
| 2,656,764 | Johnson | Oct. 27, 1953 |

FOREIGN PATENTS

| | | |
|---|---|---|
| 558,615 | Great Britain | Jan. 13, 1944 |
| 450,982 | Italy | Aug. 19, 1949 |